March 11, 1947.                    G. F. DALY                    2,417,354
             PROJECTION APPARATUS FOR BOMBARDIER TRAINING APPARATUS
                        Filed Oct. 17, 1945           2 Sheets-Sheet 1
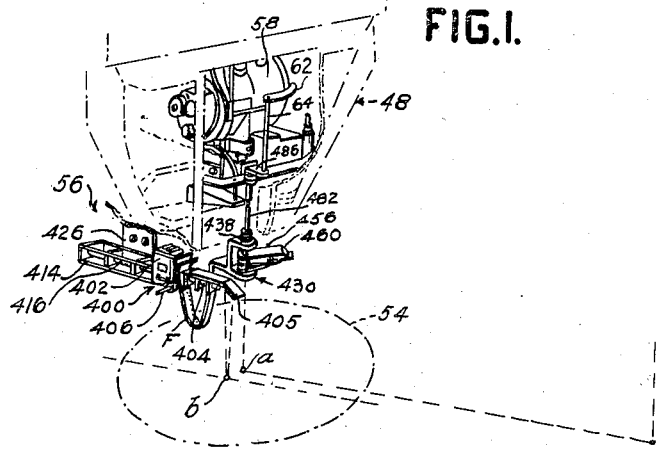
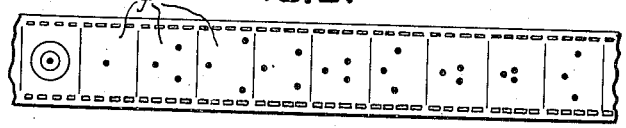
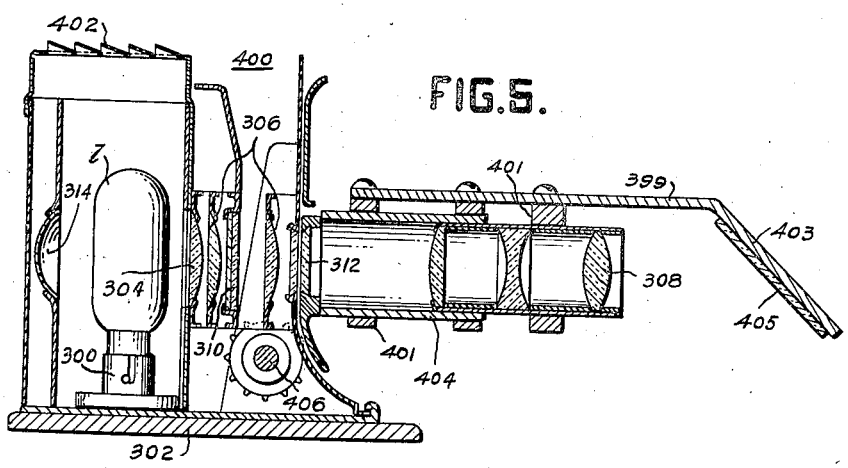
INVENTOR.
GEORGE F. DALY
BY
ATTORNEY March 11, 1947.  G. F. DALY  2,417,354
PROJECTION APPARATUS FOR BOMBARDIER TRAINING APPARATUS
Filed Oct. 17, 1945  2 Sheets-Sheet 2

INVENTOR
GEORGE F. DALY.
BY
ATTORNEY

Patented Mar. 11, 1947

2,417,354

UNITED STATES PATENT OFFICE 2,417,354

PROJECTION APPARATUS FOR BOMBARDIER TRAINING APPARATUS

George F. Daly, Endicott, N. Y., assignor to International Business Machines Corporation, New York, N. Y., a corporation of New York Application October 17, 1945, Serial No. 622,924

6 Claims. (Cl. 88—24)

The present invention relates to projection apparatus which is designed for use in connection with training apparatus for aircraft personnel of the type disclosed in my co-pending application, Serial No. 566,804, filed December 6, 1944, for "Apparatus for training bombardiers and other aircraft personnel." This application is a continuation-in-part of the application just referred to.

The above mentioned application discloses a training apparatus for bombardiers wherein the bombardier is confronted with conditions which closely simulate those that occur during actual flying and which are intended to produce proficiency in the art of bombing. This apparatus is in the form of a bombing and dead reckoning trainer which has been designed to duplicate to the utmost degree the flight of an aircraft on an actual bombing mission, while at the same time enabling an instructor to observe the bombardier's reactions and give him valuable advice as to his procedure. The apparatus shown in this co-pending application includes a bombardier's station, commonly referred to as a mock-up, wherein the bombardier in position with his instruments may view an image of a realistic target which appears to move toward him at a uniform velocity, the target being in the form of a motion picture projected from an overhead projection apparatus onto a screen below the mock-up so that during a bombing run the bombardier may take the necessary sights, make the necessary calculations of altitude, airspeed and the like, manipulate his instruments accordingly and otherwise perform all the necessary duties that would be required of him during an actual bombing run.

The present invention specifically relates to a projection apparatus, herein referred to as a hit projector, this projector being suitably mounted on the framework of the training apparatus and bolted or otherwise secured to the bombardier's mock-up directly below the bombardier's station. The principal functions of the hit projector are to project a pattern of light on the moving target image at the exact location where a bomb or a pattern of bombs would have landed in the case of an actual flight in response to calculations and settings made by the bombardier; to provide a means in the trainer for simulating "trail," which is the distance behind the aircraft that a bomb or a pattern of bombs will strike the earth in an actual bombing run; to compensate for the difference in distance between the optical center of the bombsight, as employed in connection with the training apparatus, and its turn center; and to provide the instructor with a means for selecting various bomb patterns such as would result from the release of bombs from aircraft flying at various altitudes and in various formations.

Briefly, the hit projector comprising the present invention is in the form of a 35-mm. projection unit so modified as to adapt it for its special purpose in the training apparatus. The projector proper is so disposed and is movable relative to the bombardier's station or mock-up so that it may be moved in a fore and aft direction to vary the position of the pattern on the screen under the control of the instructor to simulate trail. The projector is also provided with control mechanism whereby the instructor may select the desired bomb pattern which it is desired to employ for any particular bomb run. The projection apparatus proper of the hit projector is coupled to the bombsight in the bombardier's mock-up compartment in such a manner that it may be moved in response to manipulations of the bombsight by the bombardier. Means are further provided whereby at the instant of bomb release in the trainer the projection apparatus proper is locked in a fixed position so that no further turning movement thereof will result even though further manipulations of the bombsight on the part of the bombardier may inadvertently be restored to.

The provision of projection apparatus of the character set forth above being the principal object of the present invention, additional objects and advantages thereof not at this time enumerated will become more readily apparent as the nature of the invention is better understood.

In the accompanying two sheets of drawings, forming a part of this specification:

Fig. 1 is a fragmentary, perspective view showing the projection apparatus comprising the present invention operatively installed in a training apparatus of the type shown in my co-pending application above referred to.

Fig. 5 is a sectional view taken substantially along the line 5—5 of Fig. 4.

Fig 6 is a fragmentary view of a strip of film designed for use in the projection apparatus showing a series of bomb patterns designed for projection by the apparatus and representing bombs released from a single aircraft.

In all of the above described views like characters of reference are employed to designate like parts throughout.

Figure 3:
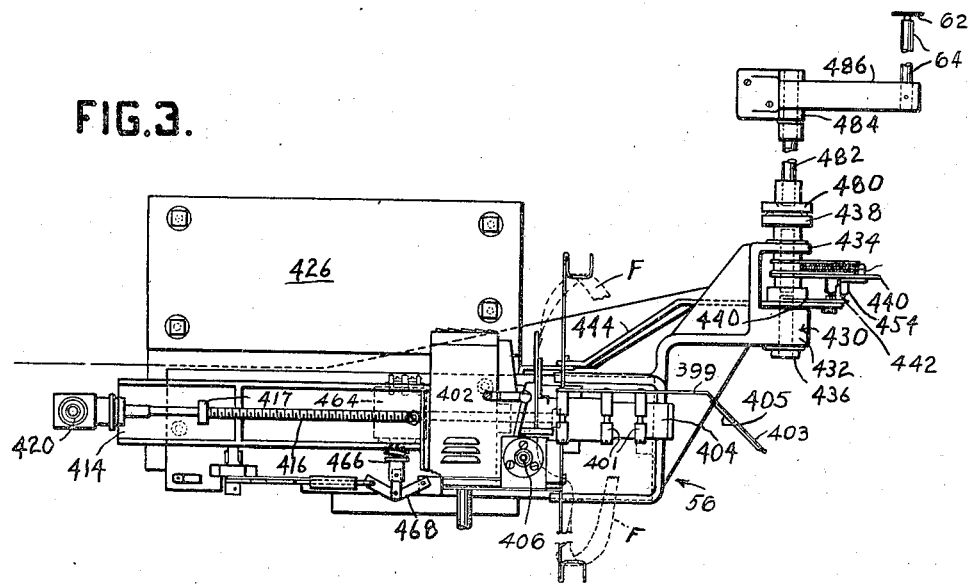
Fig. 3 is a side elevational view of the entire projection apparatus.

Referring now to the drawings in detail and in particular to Fig. 1, the hit projector assembly is designated in its entirety at 56 and is shown in this figure in full lines. The remainder of the structure shown in Fig. 1 appears in dotted lines and represents a fragmentary portion of the bombardier's compartment or mock-up, the latter being designated in its entirety at 48. Reference may be had to my above mentioned co-pending application for a full disclosure of the training apparatus to which the present hit projector is applied and for an understanding of the operation thereof. For purposes of illustrating the use to which the present hit projector may be put, it is deemed sufficient to state that the bombardier's compartment 48 includes a bombsight 58 having a conventional optical system (not shown) but the turn center of which is indicated in dotted lines and which intersects a point on the projection screen 54 and which point on the screen is designated at $a$. The bombsight 58 has associated therewith an arm 62 which is rigidly attached thereto and which in turn is attached at its outer end to a vertically extending rod 64. This latter rod is adapted to swing with the bombsight as drift is encountered and transmit motion through a series of coupling devices, subsequently to be described, to the hit projector proper.

Figure 4:
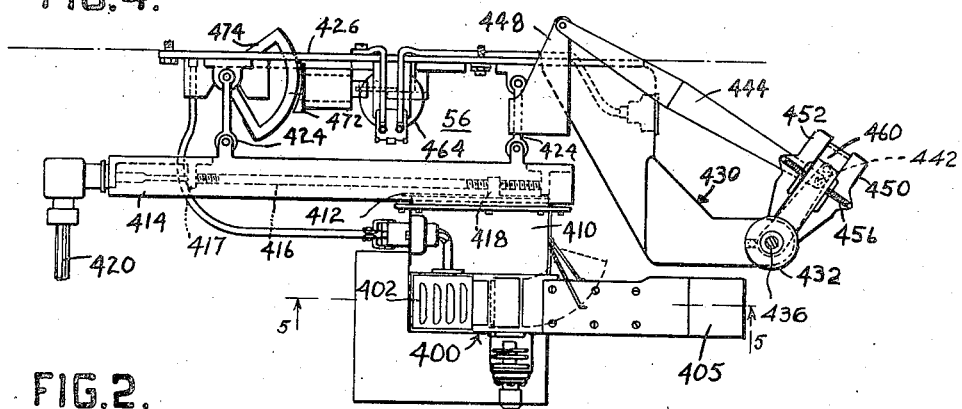
Fig. 4 is a top plan view of the projection apparatus.
Figure 2:
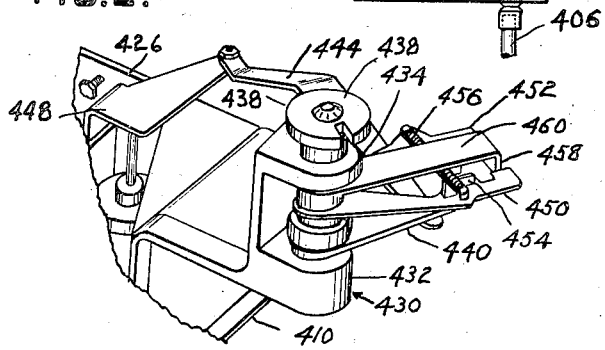
Fig. 2 is a fragmentary, perspective view of a portion of the projection apparatus.

The hit projector assembly 56 (Figs. 1 to 5 inclusive) involves in its general organization a projector proper 400 which is comprised of a casing 402 adapted to enclose a source of illumination in the form of a lamp $l$ suitably mounted in a bracket 300 carried on a base plate 302. A lens barrel 404 projects forwardly from the casing 402 and serves to enclose a multiple lens system including a series of lenses, of which there are four in number, including a concavo-convex condenser lens 304, a pair of plano-convex lenses 306 and an objective lens 308. Also included in the optical system are a heat absorbing disc 310 and aperture glasses 312. A reflector 314 positioned behind the lamp $l$ is also included in the optical system of the projector. The specific arrangement of light transmitting elements described above, and which comprises the optical system of the hit projector, is more or less conventional in its design and no claim is made herein to any novelty associated with the same, the novelty of the present invention residing rather in the specific mounting for the hit projector, its association with the training apparatus of my co-pending application and the manner in which it is thus employed.

A bracket 399 is suitably secured, as for example, by means of clamping members 401, to the lens barrel 404 and is provided with an inclined portion 403 on which there is mounted a mirror 405 which is positioned to intersect the optical center line of the lens system previously described so that a beam of light issuing from the objective lens 308 will be deflected downwardly onto the projection screen 54. An endless film F is adapted to be utilized by the projector 400 to project a series of bomb patterns onto the target image on the screen 54. A typical film that may be employed is illustrated in Fig. 6. This film is endless and includes a series of frames $f$, $f$, each embodying a different bomb pattern. The particular film shown may be of the 35-mm. type. Various frames of the film are adapted to be selected at the will of the operator for projection onto the target screen. The selecting mechanism of the projector, whereby different frames or sections of film representing different bomb patterns, is controlled through a flexible cable 406 leading to a pattern selector crank included in the instructor's set-up panel, as illustrated and described in my above mentioned co-pending application. The specific nature of the film moving and frame selecting mechanism employed herein forms no part of the present invention and no claim is made to any novelty associated with the same.

The projector proper 400 is mounted in a bracket 410 attached to a slidable plate 412 which is longitudinally shiftable in a channel-shaped frame member 414 and which, therefore, permits the projector to be moved in a fore and aft direction. A lead screw 416 mounted in lugs 417 passes through an ear 418 formed in the plate 412 and the fore and aft position of the plate, and consequently of the whole projector assembly proper, is controlled by means of a flexible cable 420 leading to an instructor's trail set crank, not shown herein but illustrated in my said co-pending application. Thus the instructor, by manipulating the crank according to his determination of the proper degree of trail for the particular problem at hand, may adjust the longitudinal position of the projector assembly prior to any particular bombing run.

The frame member 414 is pivotally attached by means of swinging hinges or arms 424 (Fig. 4) to a plate 426, by means of which plate it is secured in any suitable manner to the underneath side of the bombardier's compartment 48. As actually constructed, the bombsight telescope sight line, or in other words, the optical center of the bombsight, is offset a slight distance from the turn center of the bombsight. In actual practice, when the aircraft is in flight during a bombing run this distance is totally insignificant. However, in the trainer, because of the fact that the bombsight is located a relatively short distance from the plane of the target screen, the distance between the optical center and the turn center of the bombsight must be given due consideration. Accordingly, the length of the swinging arms 424 between the two pivotal points thereof corresponds to the offset distance between the turn center and the optical center of the bombsight. In Fig. 1 the optical center, or in other words, the point at which the bombsight telescope sight line intersects the target image, is designated at $b$ and the distance from the point $a$ to the point $b$ corresponds to the length of the links 424.

The bracket 410 has formed thereon an extension 430 including a pair of ears 432 and 434 respectively, which serve to support therebetween a pivot pin 436 to the upper end of which, above the ear 434, there is secured a coupling member 438. A swinging arm 440 is loosely mounted on the pin 436 and projects outwardly therefrom between the two ears 432 and 434 and has formed on its outer end an upstanding pin 442. This arm has pivoted thereto in the medial regions thereof one end of a link 444, the other end of which is pivotally connected to an arm 448 secured to one of the arms or hinges 424. Thus it will be seen that upon swinging movement of the arm 440 in one direction or the other, swinging motion will be transmitted through the link 444 and arm 440 to the entire projector assembly. A pair of outwardly extending arms or scissor members 450 and 452 are loosely disposed on the pin 436, project outwardly therefrom, and are provided with downwardly extending abutment portions 454 designed to straddle the pin 442 and bear inwardly thereagainst on opposite sides thereof by virtue of a tension spring 456, the opposite ends of which are connected to the scissor arms and tend to draw the same together. Since the arm 440 and two scissor members 450 and 452 are all loosely mounted on the pin, these members are normally capable of swinging laterally in either direction as a unit when torque is applied thereto. The ends of the scissor members 450 and 452 are spaced apart and serve to receive therebetween the downwardly turned end 458 of a driver arm 460 which is anchored to the pin 436.

It will be seen, therefore, from the above description of parts that because the coupling member 438 and driver arm 460 are the only two elements of the combination just described that are anchored to the pin 436, torque applied to the lower coupling member in either direction will serve to swing the entire scissors arrangement bodily in one direction or the other.

A solenoid 464 secured to the bracket 410 is provided with a movable core 466, the lower end of which is connected to a toggle joint 468, one end of which is anchored to a stationary portion of the bracket and the other end of which is connected to a thrust member 470 which is connected at one end to a brake shoe 472 designed for cooperation with a swinging brake element 474 which moves in unison with one of the arms 424. Upon energization of the solenoid 464, the core 466 thereof is adapted to be drawn upwardly to actuate the toggle joint 468 and cause the brake shoe 472 to engage the brake element 474 and prevent swinging movement thereof. It will be seen that such locking of the brake element 474 will, by virtue of its rigid connection to the arm 424, lock the entire projector carriage against further movement in either direction.

The coupling member 438 has associated therewith a counterpart coupling member 480 mounted on a shaft 482, the upper end of which is journaled in a bracket 484 and secured to a laterally extending arm 486, the free end of which is connected to the previously mentioned vertically extending rod 64 (see also Fig. 1) attached to the outer end of the arm 62 which in turn is secured to and turns with the bombsight mechanism 58. This latter shaft is adapted to swing with the bombsight as drift is encountered in the training apparatus, thus transmitting motion through the coupling member 438, 480, to the scissors assembly to cause the projector assembly 400 to be moved in an arcuate path, as previously described.

In the training apparatus, means are provided for energizing the solenoid 464 at the time of bomb release and thus it will be seen that after the bombs are released, turning movement of the bombsight on the part of the bombardier will have no effect on the hit projector inasmuch as such turning movement will merely serve to cause one or the other of the two scissors members 450 or 452, as the case may be, to swing away from the pin 442 without disturbing the setting of the hit projector. Upon manual release of the bombsight, the action of the spring 456 will be to restore the two scissor members to their normal positions wherein the two abutment portions 454 thereof engage the pin 442 on opposite sides of the latter.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention. It is the intention, therefore, to be limited only as indicated by the scope of the following claims.

What is claimed is:

1. Projection apparatus of the character described comprising a support, a frame member, a photographic projector mounted on said support and movable therewith, a pair of parallel connecting arms of equal length each having one end pivoted to the support and the other end pivoted to the frame whereby the latter is mounted for swinging movement while maintaining the same directional orientation, an arm secured to one of said connecting arms and projecting outwardly therefrom, a link having one end pivoted to the free end of said arm, a floating arm mounted for swing movement about an axis, the other end of said link being pivoted to said floating arm, a driving arm mounted for swinging movement about said axis, a yielding lost motion connection between said driving arm and floating arm, means for locking said frame member against swinging movement, and means for moving said driving arm.

2. Projection apparatus of the character described comprising a support, a frame member, a photographic projector mounted on said support and movable therewith, a pair of parallel connecting arms of equal length each having one end pivoted to the support and the other end pivoted to the frame whereby the latter is mounted for swinging movement while maintaining the same directional orientation, an arm secured to one of said connecting arms and projecting outwardly therefrom, a link having one end pivoted to the free end of said arm, a floating arm mounted for swinging movement about an axis, the other end of said link being pivoted to said floating arm, a driving arm mounted for swinging movement about said axis, a yielding lost motion connection between said driving arm and floating arm, electromagnetically operable means for locking said frame member against swinging movement, and means for moving said driving arm.

3. Projection apparatus of the character described comprising a support, a frame member, a photographic projector mounted on said support and movable therewith, a pair of parallel connecting arms of equal length each having one end pivoted to the support and the other end pivoted to the frame whereby the latter is mounted for swinging movement while maintaining the same directional orientation, an arm secured to one of said connecting arms and projecting outwardly therefrom, a link having one end pivoted to the free end of said arm, a floating arm mounted for swinging movement about an axis, the other end of said link being pivoted to said floating arm, a driving arm mounted for swinging movement about said axis, a yielding lost motion connection between said driving arm and floating arm, a brake element fixedly secured to the other of said connecting arms, a cooperating brake shoe for said brake element, means for actuating said brake shoe, and means for moving said driving arm.

4. Projection apparatus of the character described comprising a support, a frame member, a photographic projector mounted on said support and movable therewith, a pair of parallel connecting arms of equal length each having one end pivoted to the support and the other end pivoted to the frame whereby the latter is mounted for swinging movement while maintaining the same directional orientation, an arm secured to one of said connecting arms and projecting outwardly therefrom, a link having one end pivoted to the free end of said arm, a floating arm mounted for swinging movement about an axis, the other end of said link being pivoted to said floating arm, a driving arm mounted for swinging movement about said axis, a yielding lost motion connection between said driving arm and floating arm, a brake element fixedly secured to the other of said connecting arms, a cooperating brake shoe for said brake element, an electromagnet for actuating said brake shoe to cause the same to engage said brake element and lock said frame member against swinging movement, and means for moving said driving arm.

5. Projection apparatus of the character described comprising a support, a frame member, a photographic projector adjustably mounted on said support and movable bodily therewith, means for adjusting the position of said projector relative to the support, a pair of parallel connecting arms of equal length each having one end pivoted to the support and the other end pivoted to the frame member whereby the latter is mounted for swinging movement while maintaining the same directional orientation, an arm secured to one of said connecting arms and projecting outwardly therefrom, a link having one end pivoted to the free end of said arm, a floating arm mounted for swinging movement about an axis, the other end of said link being pivoted to said floating arm, a driving arm mounted for swinging movement about said axis, a yielding lost motion connection between said driving arm and floating arm, means for locking said frame member against swinging movement, and means for moving said driving arm.

6. Projection apparatus of the character described comprising a support, a frame member, a photographic projector mounted on said support and movable therewith, a pair of parallel connecting arms of equal length each having one end pivoted to the support and the other end pivoted to the frame whereby the latter is mounted for swinging movement while maintaining the same directional orientation, an arm secured to one of said connecting arms and projecting outwardly therefrom, a link having one end pivoted to the free end of said arm, a floating arm mounted for swinging movement about an axis, the other end of said link being pivoted to said floating arm, a driving arm mounted for swinging movement about said axis, a yielding lost motion connection between said driving arm and floating arm, a brake element fixedly secured to the other of said connecting arms, a cooperating brake shoe for said brake element, a thrust member connected to said brake shoe, a toggle joint for actuating said thrust member, electromagnetic means for actuating said toggle joint, and means for moving said driving arm.

GEORGE F. DALY.

REFERENCES CITED

The following references are of record in the file of this patent:

UNITED STATES PATENTS

| Number | Name | Date |
| --- | --- | --- |
| 1,602,499 | Meinecke | Oct. 12, 1926 |
| 2,372,494 | Hogan et al. | Mar. 27, 1945 |
| 2,400,942 | Milner | May 28, 1946 |
| 1,953,299 | Grant | Apr. 3, 1934 |
| 1,693,969 | Villiger et al. | Dec. 4, 1928 |
| 1,703,933 | Hartness | Mar. 5, 1929 |